July 3, 1951

T. K. MACE 2,559,363

VEHICLE BRAKE

Filed May 8, 1948

INVENTOR
THOMAS KEMP MACE
by Walter S. Bleston
ATTORNEY

Patented July 3, 1951

2,559,363

UNITED STATES PATENT OFFICE 2,559,363

VEHICLE BRAKE

Thomas Kemp Mace, Birmingham, England, assignor to Girling Limited, Birmingham, England Application May 8, 1948, Serial No. 25,889
In Great Britain May 15, 1947

4 Claims. (Cl. 188—79.5)

This invention relates to improvements in vehicle brakes of the kind in which pivoted shoes carrying a friction lining are mounted within a rotatable drum, and the shoes, as described and claimed in the specification of U. S. Patent No. 2,371,554, are not positively held out of contact with the drum when the brake is in the "off" position, but are in light rubbing contact with the drum.

Although the effect of the light rubbing contact is negligible insofar as it affects performance it is desirable to keep this effect to a minimum, particularly in the case of the leading shoe to prevent any risk of that shoe being picked up by the rotating drum.

According to the invention, in a brake of the kind specified, the friction lining on a shoe is at one point movable towards and away from the surface of the shoe and is resiliently urged away from the surface of the shoe through a predetermined distance so that when the brake is in the "off" position this portion of the lining projects beyond the surface contour of the rest of the lining by the said predetermined distance and only this portion of the lining is in contact with the drum.

When the brake is applied the projecting portion of the lining is forced inwardly against the surface of the shoe so that it wears at the same rate as the rest of the lining, and in the "off" position of the brake the extent to which the projecting portion extends beyond the surface of the rest of the lining is independent of the wear of the lining and remains constant throughout the life of the lining.

The arrangement is thus automatically self-compensating for wear of the lining and also self-compensating for temperature, as in the "off" position of the shoe the clearance between the drum and the major part of the lining is determined by the extent of projection of the movable part of the lining and if the shoe follows the drum as the drum expands during prolonged braking the clearance is automatically restored to normal when the drum cools and contracts.

The movable part of the lining is preferably arranged at the point in the length of the shoe where the residual drum drag in the brake off position will be at a minimum. This is the point at which the reaction of the drum on an element of lining has the maximum leverage about the anchor pin of the shoe.

The position of this point depends on the co-efficient of friction of the shoe lining. If the lining has a friction co-efficient of tan $\theta$ the required point lies at an angle of $\theta$ on the anchor pin side of the diameter of the drum at right angles to a diameter passing through the anchor pin.

Various means may be employed for maintaining a predetermined projection of a portion of the shoe lining.

Two practical forms of my invention are illustrated by way of example in the accompanying drawings in which.

Figure 1:
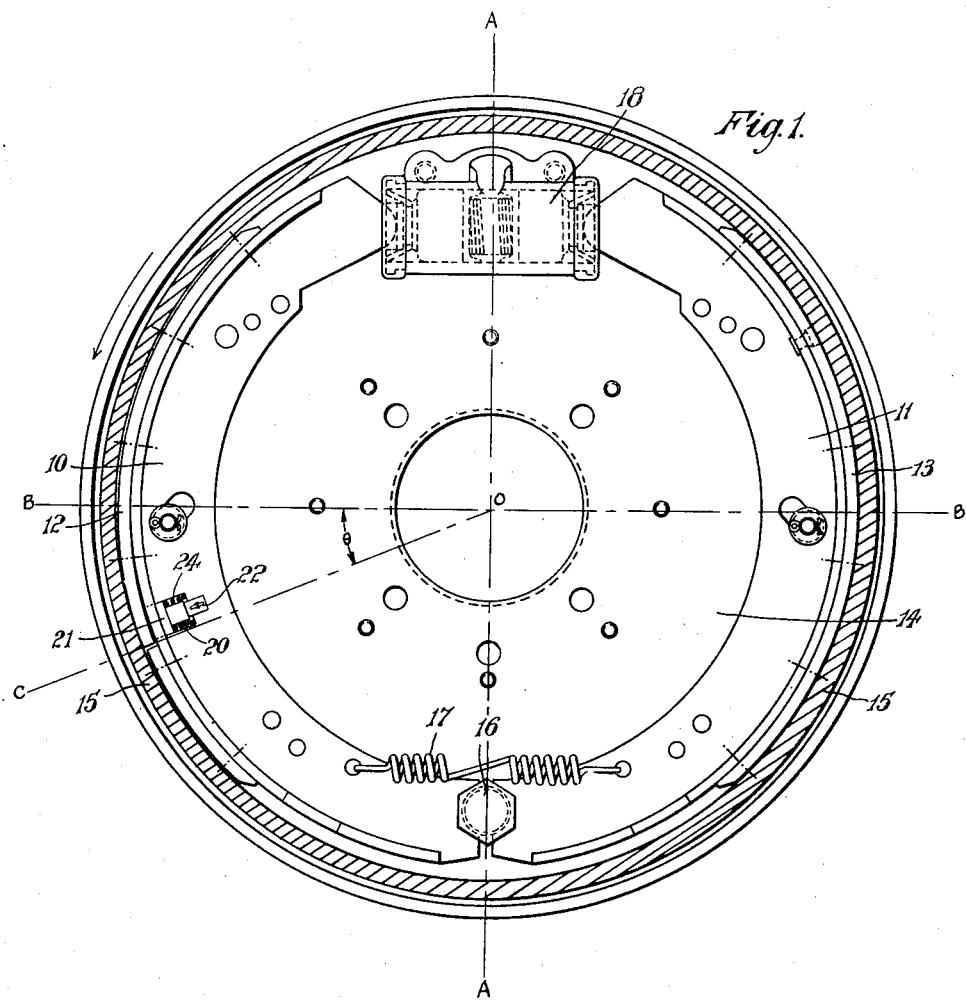
Figure 1 is an elevation of a vehicle brake incorporating one form of my invention.

Figure 1 shows a vehicle brake in which two arcuate shoes 10, 11 carrying linings 12, 13 of friction material are mounted on a stationary back-plate 14 within a drum 15 rotating with one of the vehicle wheels. The shoes are adapted to rock on an anchor pin 16 mounted on the back-plate, the shoes being held in engagement with the anchor-pin by a spring 17. The ends of the shoes remote from the anchor pin are adapted to be separated to bring the shoes into contact with the drum by any convenient form of shoe-spreading means such as the double-ended hydraulic wheel cylinder 18. When the drum 15 is rotating in the direction indicated by the arrow the shoe 10 is a leading shoe and the shoe 11 is a trailing shoe.

When the brake is in the off position the forces acting on the shoes are such that the shoes are in light rubbing contact with the drum as described in the specification of U. S. Patent No. 2,371,554.

The shoe 10 is provided with means for causing a portion of the friction lining carried by the shoe to project for a small predetermined distance beyond the rest of the lining so that only that portion of the lining makes contact with the drum when the brake is in the off position.

The position of this projecting portion of the lining is at the point in the length of the shoe where the residual drum drag in the brake off position is at a minimum, and this position depends on the co-efficient of friction of the shoe lining.

If the co-efficient of friction of the shoe lining is say .4, which is the tangent of an angle $\theta$ of 22°, the required point lies on a line OC (Fig. 1) which is at an angle of $\theta$, 22°, to and on the anchor pin side of a diameter BOB of the drum at right angles to the diameter AOA passing through the shoe anchor pin 16. The point is thus intermediate the ends of the shoe and spaced at a greater distance from the actuated end of the shoe than from the end which engages the anchor pin.

Figure 2:
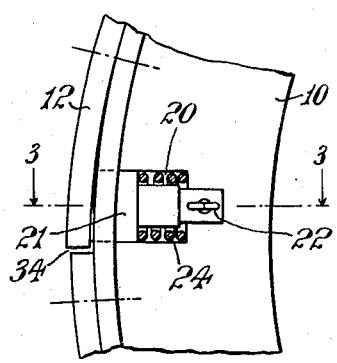
Figure 2 is a fragmentary elevation on a larger scale of the means for maintaining a portion of the brake lining spaced from the surface of the shoe.
Figure 3:
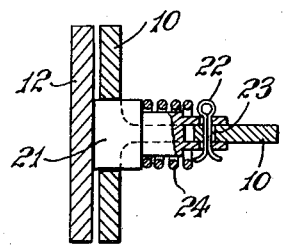
Figure 3 is a section on the line 3—3 of Figure 2.

In the arrangement shown in Figures 1, 2 and 3 a radial slot 20 is formed in the web and flange of the shoe which is of the usual T section comprising a flat web and an arcuate flange to which the friction lining is secured by rivets. Housed in the slot is a plunger 21 of which the outer end is adapted to extend through the slot in the flange. The inner end of the plunger is bifurcated or slotted to fit on each side of the shoe web on the inner side of the slot as shown in Figure 3, and a pin 22 is passed transversely through a hole in the plunger and through a registering hole 23 in the shoe web, the relative dimensions of the pin and hole being such as to allow a small radial movement of the plunger relative to the shoe. A compression spring 24 fitting around the plunger within the slot 20 in the shoe web and abutting between the inner end of the slot and the head of the plunger urges the plunger radially outwards so that the pin 22 normally lies against the outer side of the hole 23.

The holes in the plunger and the shoe web to receive the pin 22 are preferably made of the same diameter, and in preparing the shoe a temporary plain pin of the full diameter of the holes is fitted. The surface of the shoe flange including the outer face of the plunger lying in the slot in the flange is then ground concentric and the friction lining is fitted to the flange. The lining is then cut through transversely on the anchor pin side of the plunger as shown at 34, and the temporary pin is removed and replaced by the pin 22 which is of smaller diameter so that the spring 24 acting on the plunger urges the free portion of the lining outwardly away from the shoe flange by an amount equal to the difference between the diameter of the pin 22 and that of the hole 23. This amount need only be very small and will usually be of the order of 5 to 10 thousandths of an inch.

Figure 4:
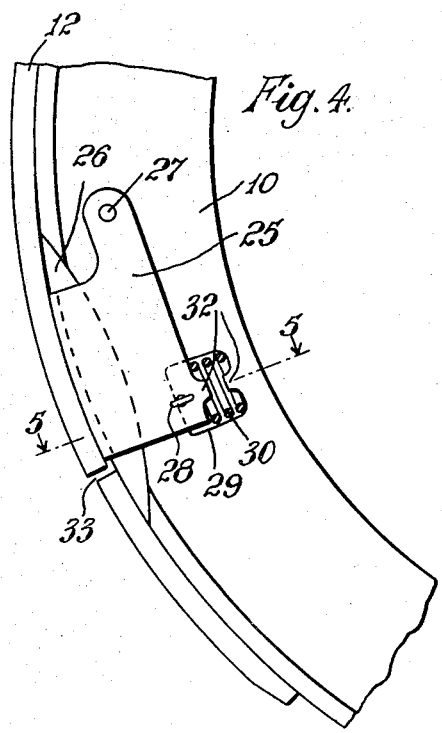
Figure 4 is a fragmentary elevation of a part of a brake shoe embodying an alternative means for maintaining a portion of the brake lining spaced from the surface of the shoe.
Figure 5:
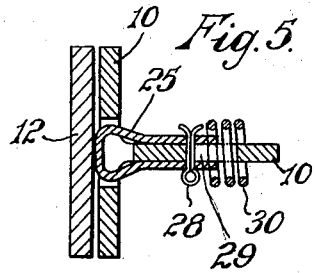
Figure 5 is a section on the line 5—5 of Figure 4.
Figure 6:
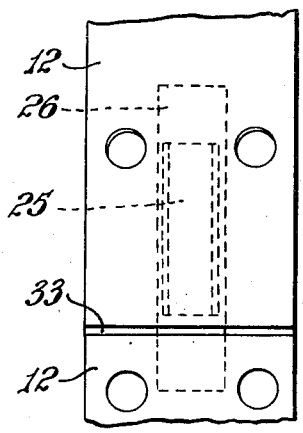
Figure 6 is a fragmentary view of the shoe lining adjacent to the means shown in Figures 4 and 5.

In the arrangement shown in Figures 4, 5 and 6 a lever 25 formed by folding from sheet metal is fitted through a slot 26 cut in the flange of the shoe and extending into the web.

The limbs of the lever lie on opposite sides of the shoe web to which the lever is pivoted at one end by a pin 27.

At the other end of the lever a pin 28 passes transversely through aligned holes in the limbs of the lever and through a rectangular opening 29 in the shoe web. A compression spring 30 is arranged between this end of the lever and the inner end of the opening 29 in the shoe web, the spring being located by projections 32 on the lever and on the inner end of the opening which enter the ends of the spring.

In preparing the shoe a shim is inserted between the pin 28 and the outer end of the slot 29 while the surface of the shoe flange including the outer part of the lever lying in the slot 26 is ground concentric. The lining is then fitted and is cut through transversely as shown at 33 on the anchor pin side of the lever and the shim is removed to allow the lever to urge the free portion of the lining outwardly by an amount equal to the movement of the pin 28 in the slot 29.

It will be understood that means for maintaining a portion of the lining projected beyond the surface of the rest of the lining may be provided on both shoes of a two-shoe brake or on the leading shoe only.

It will also be understood that the free portion of the shoe lining may extend either in the direction of rotation of the drum or against that direction. Preferably the free portion will usually be so arranged that dust worn off the friction lining when the brake is in use will not accumulate behind the free portion of the lining but will fall out towards the bottom of the brake.

I claim:

1. A brake of the kind specified comprising a rotatable drum, an arcuate shoe mounted within said drum for co-operation therewith, a stationary anchor pin engaged by one end of said shoe, a friction lining mounted on said shoe and having a friction co-efficient of tan $\theta$, a portion of said lining being movable towards and away from the surface of the drum, said portion being located at a point lying at an angle of $\theta$ on the anchor pin side of the diameter of the drum at right angles to a diameter passing through the anchor pin, and yielding means for urging said movable portion of the lining away from the shoe through a small predetermined distance.

2. A brake of the kind specified including a rotatable drum, an arcuate shoe having a web and an arcuate flange and being mounted within said drum for co-operation therewith, a stationary anchor pin engaged by one end of said shoe, a friction lining having a friction co-efficient of tan $\theta$ and being secured to said flange except at a point where the lining is movable towards and away from the surface of said drum, said point being located substantially at an angle $\theta$ on the anchor pin side of the diameter of the drum at right angles to a diameter passing through said anchor pin, an opening being provided in said flange in alignment with said movable part of the lining, a member mounted on the shoe web for limited substantially radial movement thereon and extending into said opening, and resilient means urging said member outwardly through said opening for a predetermined distance to hold said movable part of the lining spaced from the shoe flange when the brake is in the off position.

3. A brake of the kind specified including a rotatable drum, an arcuate shoe having a web and an arcuate flange and being mounted within said drum for co-operation therewith, a stationary anchor pin engaged by one end of said shoe, a friction lining having a friction co-efficient of tan $\theta$ and being secured to said flange except at a point where the lining is movable towards and away from the surface of said drum, said point being located substantially at an angle $\theta$ on the anchor pin side of the diameter of the drum at right angles to a diameter passing through said anchor pin, an opening being provided in said flange in alignment with the movable part of the lining, a plunger slidably mounted on the shoe web for limited radial movement thereon and extending into said opening, and resilient means between said web and said plunger urging said plunger radially outwards to hold said movable part of the lining spaced from the shoe flange by a small predetermined distance when the brake is in the off position.

4. A brake of the kind specified including a rotatable drum, an arcuate shoe having a web and an arcuate flange and being mounted within said drum for co-operation therewith, a stationary anchor pin engaged by one end of said shoe, a friction lining having a friction co-efficient of $\tan \theta$ and being secured to said flange except at a point where the lining is movable towards and away from the surface of said drum, said point being located substantially at an angle $\theta$ on the anchor pin side of the diameter of the drum at right angles to a diameter passing through said anchor pin, an opening being provided in said flange in alignment with the movable part of the lining, a lever pivotally mounted at one end on the shoe web and extending at the other end into said opening, means for limiting the angular movement of said lever about its pivot, and spring means bearing on said lever and urging it in a direction to project through said opening and hold said movable part of the lining spaced from the shoe flange by a small predetermined distance when the brake is in the off position.

THOMAS KEMP MACE.

REFERENCES CITED

The following references are of record in the file of this patent:

UNITED STATES PATENTS

| Number | Name | Date |
|---|---|---|
| 935,644 | Coffin | Oct. 5, 1909 |
| 2,371,554 | Scott-Iverseen | Mar. 13, 1945 |

FOREIGN PATENTS

| Number | Country | Date |
|---|---|---|
| 14,691 | Great Britain | June 27, 1906 |
| 353,206 | Great Britain | July 23, 1931 |